United States Patent [19]
Erola et al.

[11] Patent Number: 6,092,133
[45] Date of Patent: *Jul. 18, 2000

[54] METHOD FOR CONVEYING CONTROL COMMANDS FOR SIM CARD FROM EXTERNAL APPARATUS TO SIM CARD

[75] Inventors: Mika Erola; Jukka-Pekka Honkanen, both of Tampere; Harri Halminen, Pirkkala, all of Finland

[73] Assignee: Nokia Mobile Phones Ltd, Espoo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/959,315

[22] Filed: Oct. 28, 1997

[30] Foreign Application Priority Data

Dec. 17, 1996 [FI] Finland ..................................... 965071

[51] Int. Cl.⁷ .............................. H04M 11/00; G06K 5/00
[52] U.S. Cl. .......................... 710/102; 455/418; 455/432; 235/380; 235/492
[58] Field of Search ............................. 395/282; 455/418, 455/432, 445, 411, 406, 456, 90; 380/23, 25, 49; 235/379, 492, 487, 493, 380, 439, 441

[56] References Cited

U.S. PATENT DOCUMENTS

| | | | |
|---|---|---|---|
| 4,868,846 | 9/1989 | Kemppi | 379/144 |
| 5,266,782 | 11/1993 | Alanara et al. | 235/380 |
| 5,315,638 | 5/1994 | Mukari | 379/58 |
| 5,353,328 | 10/1994 | Jokimies | 379/58 |
| 5,418,837 | 5/1995 | Johansson et al. | 379/58 |
| 5,448,622 | 9/1995 | Huttunen | 379/58 |
| 5,487,084 | 1/1996 | Lindholm | 375/215 |
| 5,600,708 | 2/1997 | Meche et al. | 379/59 |
| 5,764,730 | 6/1998 | Rabe et al. | 379/58 |
| 5,765,105 | 6/1998 | Kuriki | 455/410 |

OTHER PUBLICATIONS

"The GSM System for Mobile Communications", Mouley et al., ISBN 2–9507190–0–7, Palaiseau 1992.
ISO/IEC 7816–4.: 1995E.
ISO 7816–2 (1988) and ISO/IEC 7816–3 (1989).
ISO 7816–3: 1989 (E).

*Primary Examiner*—Glenn A. Auve
*Assistant Examiner*—Tim Vo
*Attorney, Agent, or Firm*—Perman & Green, LLP

[57] ABSTRACT

The method according to the invention can be used for conveying low-level SIM card commands from an external apparatus (12) of a mobile station (1) to a SIM card (2) connected to the mobile station. The invention is based on locking the SIM card (2) solely for a particular control element (10) for the duration of the exchange of low-level commands. The mobile station according to the invention advantageously includes two SIM card control elements (4, 10) the first of which (4) is intended for executing commands issued by internal blocks of the mobile station and the second of which (10) is intended for conveying low-level commands from an external apparatus (12) connected to the mobile station. Said first control element (4) receives high-level commands from the various blocks (6) of the mobile station and conveys to the SIM card (2) the corresponding low-level command sequences. Said second control element (10) reserves the SIM card (2) for itself, when necessary, whereafter the external apparatus (12) connected to the mobile station can issue low-level commands which are conveyed by said second control element (10) to the SIM card (2). Said second control element (10) frees the SIM card only when the external apparatus (12) indicates that the command sequence has ended. If said first control element (4) receives a command during the command sequence of the external apparatus, the first control element (4) remains waiting and executes the operations required by the command after the SIM card (2) has been released and is no more used by said second control element (10).

12 Claims, 9 Drawing Sheets

METHOD FOR CONVEYING CONTROL COMMANDS FOR SIM CARD FROM EXTERNAL APPARATUS TO SIM CARD

BACKGROUND OF THE INVENTION

The invention relates to smart cards in connection with mobile communication devices, more specifically to the communication between apparatuses external to a mobile communication device and a smart card connected to the mobile communication device.

A subscriber identity module, known as a SIM card, is a smart card used in mobile communication devices, like in mobile stations, in the GSM system, comprising e.g. the subscriber's identification information such as the subscriber's phone number. The GSM system directs a user's incoming calls to the mobile station which has the user's SIM card in it. The user can change mobile stations simply by moving the SIM card from an apparatus to another. In addition to said identification information, also short messages in accordance with the SMS service, the user's private phone book and other user-selectable information can be stored on the SIM card. Furthermore, the GSM system may store various control data on the SIM card. The SIM card and the structure of the GSM system are described in more detail e.g. in "The GSM System for Mobile Communications" by Michel Mouly and Marie-Bernadette Pautet. ISBN 2-9507190-0-7, Palaiseau 1992. The SIM card is described in detail in the GSM recommendation ETSI GSM 11.11 and in the ISO/IEC 7816 standard.

Information on the SIM card is organized in files and inside the files typically in records. The SIM card is controlled using low-level commands, or so-called APDU commands, the structure of which is described in detail in paragraph 5.3 of the ISO/IEC 7816-4 standard. For example, when reading information from the SIM card, the first command must tell the card to select a particular file and data record. Then, by means of a second command, the SIM card can be told to return the value of the data record in question.

Thus, storing information on the card and reading it from the card require several commands which have to be given consecutively in a correct order. In the prior art, the correct order of the commands is ensured using a SIM card control element which receives commands from the other blocks of the mobile station, carries out the actions required by the commands and returns possible results to the blocks that issued the commands. Typically, the other blocks of the mobile station give only one high-level command to the SIM card control element to indicate the action they require, and the SIM card control element is responsible for sending the corresponding low-level APDU command sequence to the SIM card.

FIG. 1 shows an example of a system according to the prior art. The system of this example comprises a mobile station 1 which includes a communication part 6, a SIM control element 4, a SIM card interface 16 and an I/O interface 8. The system also includes a SIM card 2 connected to the SIM card interface and an external apparatus 12, such as a portable computer, for example, connected to the mobile station's I/O interface. As a further example, the mobile station and the external apparatus may be functional units of a single device such as a multifunction portable communication device, which comprises a mobile station means and a computer, in which case the I/O interface between the mobile station means and the computer is internal to the multifunction portable communication device. FIG. 2 shows an example of message exchange in the system according to FIG. 1.

FIG. 2 shows an example of the SIM card control messaging according to the prior art. The example describes the operation of the SIM card control element 4 in a situation where the control element 4 receives a new high-level command while executing the SIM card command sequence required by the previous high-level command. To illustrate this, the example of FIG. 2 includes two communication part blocks 6a, 6b which process the information on the SIM card 2 and which both give high-level commands to the SIM card control element. In practice, the blocks 6a, 6b may be e.g. two software processes running in the mobile station's processor, handling different functions.

The SIM card control element 4 receives from the other blocks 6a, 6b of the mobile station manipulation commands for the SIM card 2 and manipulates the SIM card according to the commands. In the example of FIG. 2, a first block 6a of the mobile station sends to the SIM card control element a fetch command for the SIM card's IMSI code. The SIM card control element is responsible for giving the low-level instructions to the SIM card. First, the SIM card control element 4 sends to the SIM card 2 a select IMSI file command and the SIM card responds by returning an acknowledgment. Having received the acknowledgment the SIM card control element 4 sends to the SIM card 2 a read IMSI code command, and the SIM card returns the desired IMSI code to the control element 4. The SIM card control element returns the IMSI code to the first block 6a.

In the example of FIG. 2, a second block 6b of the communication part sends to the SIM card control element a store SMS request at the same time when the control element is exchanging information with the SIM card. The SIM card control element 4 will not start processing the command from the second block 6b immediately, but the command remains waiting until the control element finishes the previous task. Having returned the IMSI code to the first block 6a at the end of the previous task the SIM card control element starts processing the next command. First, the SIM card control element 4 sends a SELECT_FILE_SMS command to the SIM card, and when the SIM card has returned an acknowledgment the control element issues an UPDATE_RECORD_SMS command. When the SIM card has stored the SMS message it returns an acknowledgment to the control element which in turn returns an acknowledgment to the original command sent by the second block 6b of the communication part.

However, the prior art arrangement described above causes problems when the mobile station is connected to an external apparatus which directly manipulates the information on the mobile station's SIM card. Problems particularly arise in a situation wherein it is desirable to manipulate the information on the SIM card with complete freedom, bypassing the functions of the mobile station, using e.g. a new method unknown to the mobile station's SIM card control element. Such a property is needed e.g. when creating new GSM services. In such a case, the external apparatus must send to the mobile station low-level SIM commands which the SIM card control element merely passes on to the SIM card. Since the SIM card control element in this case does not know the command sequence needed to execute the required operation, it also does not know whether or not the command sequence initiated by the external apparatus has been completed. Therefore it is possible that the SIM card control element may start carrying out commands issued by other blocks of the mobile station in the middle of a command sequence from an external apparatus and thus cause an error. Futhermore, the arrangement according to the prior art also gives rise to problems in a situation in which multiple SIM cards are connected to a mobile station.

FIG. 3 shows a possible problematic situation according to the prior art. In this example a mobile station is connected to an external apparatus 12 such as a portable personal computer. In this example the mobile station's SIM card 2 is used by the communication part 6 of the mobile station and said external computer 12. First, the computer sends to the mobile station a SELECT_FILE_ADN command to select the desired file and record. The SIM card control element 4 passes the command on to the SIM card 2 which returns an acknowledgment. At this point, the ADN data record is selected on the SIM card, as required by the external apparatus. Then the communication part 6 of the mobile station sends to the SIM card control element an UPDATE_BCCH_INFO command, and the SIM card control element sends to the SIM card a selection command for the file and the BCCH data record. When the SIM card acknowledges that the BCCH data record is selected, the SIM card control element 4 issues an UPDATE_BINARY_BCCH command, and when the record has been updated the SIM card again returns an acknowledgment to the control element. The control element 4 in turn returns an acknowledgment to the communication part 6 of the mobile station indicating that the sequence is completed. The error occurs when the external apparatus 12 issues the next command of its command sequence, UPDATE_RECORD_ADN, which is then passed on to the SIM card by the SIM card control element. At this stage, the data record that is selected on the SIM card is the BCCH and not the ADN as presumed by the external apparatus and required by the command UPDATE_RECORD_ADN. Since the ADN and BCCH data records are of different types the SIM card detects the error and returns an error notice UPDATE_RECORD_ADN_FALSE which is then sent back to the external apparatus by the SIM card control element.

A more problematic erroneous situation arises in a case in which the data record selected in the previous command sequence is of the same type as the record required by the command issued by the external apparatus. In such a case the SIM card will not detect the error because the data record type is correct but returns an acknowledgment indicating that the command was carried out successfully. In such a case the external apparatus will not detect the error and the data is stored in the wrong file.

According to the prior art, the problematic situations described above can be avoided in such a way that the external apparatus issues only said high-level commands, e.g. like the first and second blocks 6a, 6b of the communication part, in the manner disclosed in connection with the description of FIG. 2. Then the SIM card control element can place the commands from the external apparatus in queue with the commands from the internal blocks of the mobile station and execute the low-level SIM card commands required by those commands in the correct order. The disadvantage of this arrangement is that the external apparatus can only use a selection of commands known to the SIM card control element.

SUMMARY OF THE INVENTION

An object of the invention is to provide a method with which an external apparatus can manipulate the information on a smart card connected to the host device bypassing the host device. Another object of the invention is to provide a system whereby an external apparatus can manipulate the information on a smart card using low-level commands for the smart card.

A further object of the invention is to provide a method with which an internal or external element in the system can manipulate the smart card information with low-level commands without interference from other elements in the system.

These objects are achieved by reserving the smart card for the duration of the exhange of low-level commands solely for the element which sends said low-level commands to the smart card.

The apparatus according to the invention is characterized in that it comprises a first smart card control element for receiving high-level control commands belonging to a predetermined selection of commands, for controlling a smart card connected to the smart card connection means according to a predetermined low-level command sequence corresponding to the control command in question; and a second smart card control element for receiving low-level commands and for conveying them to the smart card connected to the smart card connection means: said smart card control elements being arranged to reserve the smart card connected to the smart card connection means for one smart card control element at a time.

The system according to the invention is characterized in that it comprises a first smart card control element in the host device for receiving high-level control commands belonging to a predetermined selection of commands, for controlling a smart card connected to the smart card connection means according to a predetermined low-level command sequence corresponding to the control command in question;

a second smart card control element in the host device for receiving low-level commands and for conveying them to the smart card connected to the smart card connection means, said smart card control elements being arranged to reserve the smart card connected to the smart card connection means for one smart card control element at a time;

at least one further internal block in the host device for sending said high-level control commands to said first smart card control element;

an I/O interface in the host device for connecting external apparatuses and for transferring commands from an external apparatus to said second smart card control element; and an external apparatus connected to said I/O interface.

The invention is also directed to a method for conveying commands from a unit to a smart card, which smart card can be controlled at least via a first smart card control element and a second smart card control element, and which commands from the unit to the smart card are conveyed via the second smart card control element, which method is characterized by that it comprises steps in which said unit sends a first command to the second smart card control element, in response to said command the second smart card control element attempts to reserve the smart card for itself, when the reservation succeeds, the second smart card control element informs the unit of the reservation.

whereafter the unit sends commands to the second smart card control element which passes them on to the smart card and returns the responses from the smart card to the unit, the unit sends an end command to said second smart card control element, and in response to the end command the second control smart card element releases the smart card for use by other smart card control elements.

An apparatus external to a mobile station can apply the method according to the invention to convey low-level SIM card commands to a SIM card connected to the mobile station. The invention is based on locking the SIM card so as to be accessible only to a particular control element for the duration of the exchange of the low-level commands. The mobile station according to the invention advantageously comprises two SIM card control elements the first of which is intended for executing commands from internal blocks of the mobile station, and the second of which is intended for conveying low-level commands from an external apparatus connected to the mobile station. Said first control element receives high-level commands from various blocks of the mobile station and sends to the SIM card the corresponding low-level command sequences. Said second control element reserves the SIM card for itself, when necessary, whereafter an external apparatus connected to the mobile station can issue low-level commands which said second control element conveys to the SIM card. Said second control element frees the SIM card when the external apparatus informs that the command sequence has ended or when a predetermined time limit is exceeded. If said first control element receives a command during the command sequence of the external apparatus, the first control element remains waiting and executes the actions required by the command after the SIM card has been freed.

BRIEF DESCRIPTION OF THE DRAWINGS

The invention is described in greater detail with reference to the preferred embodiments presented by way of example and to the attached drawing in which.

Like elements in the drawing are denoted by like reference designators.

DETAILED DESCRIPTION OF THE INVENTION

Figure 1:
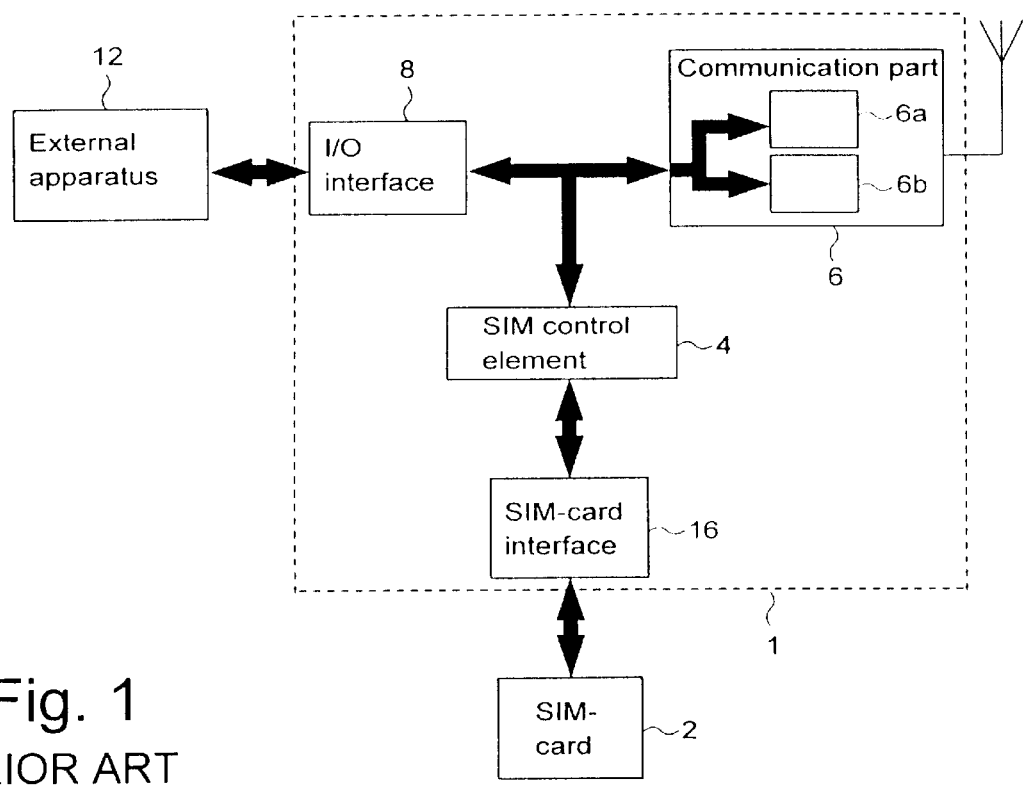
FIG. 1 shows a solution according to the prior art.
Figure 2:
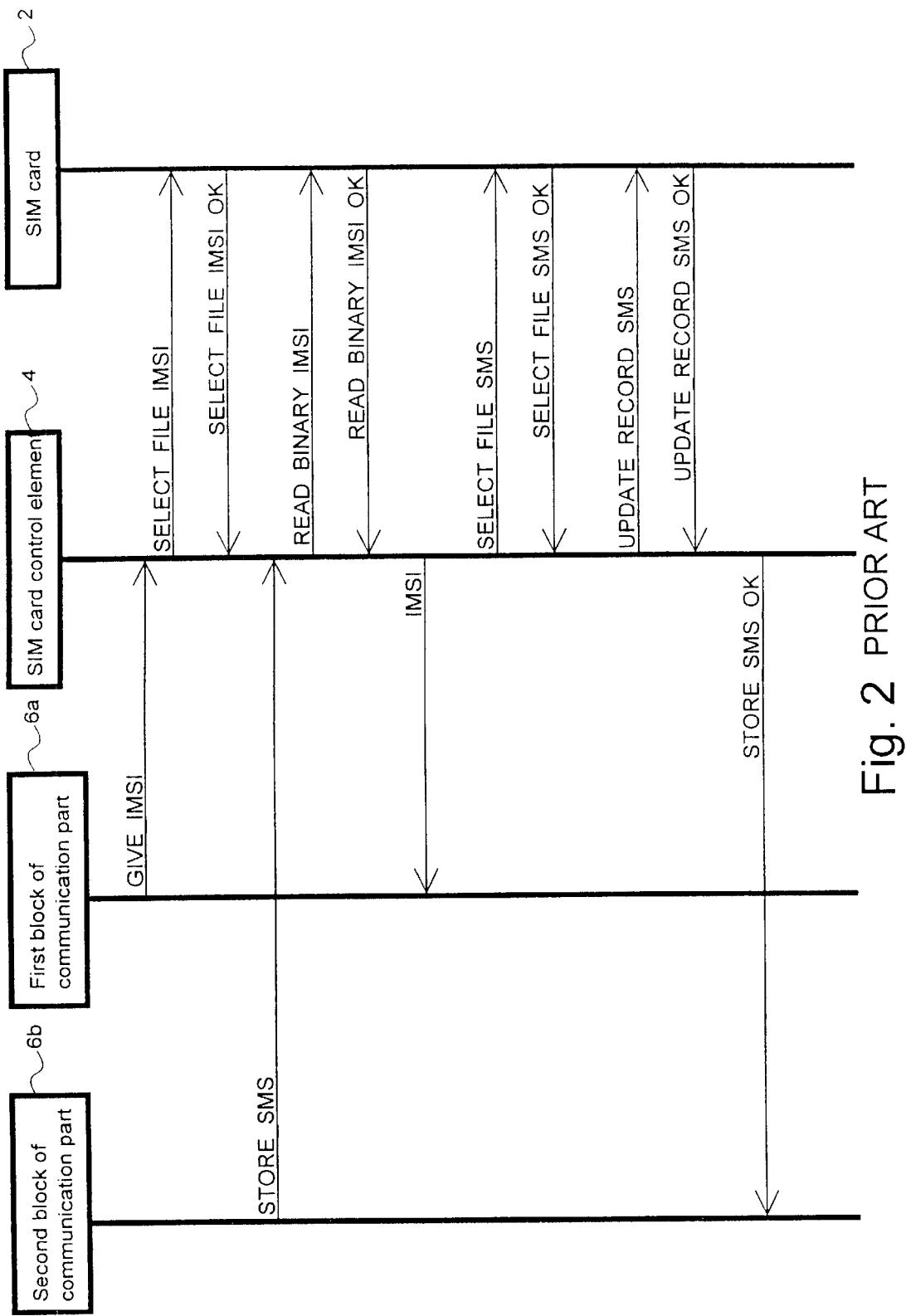
FIG. 2 shows messaging according to the prior art.
Figure 3:
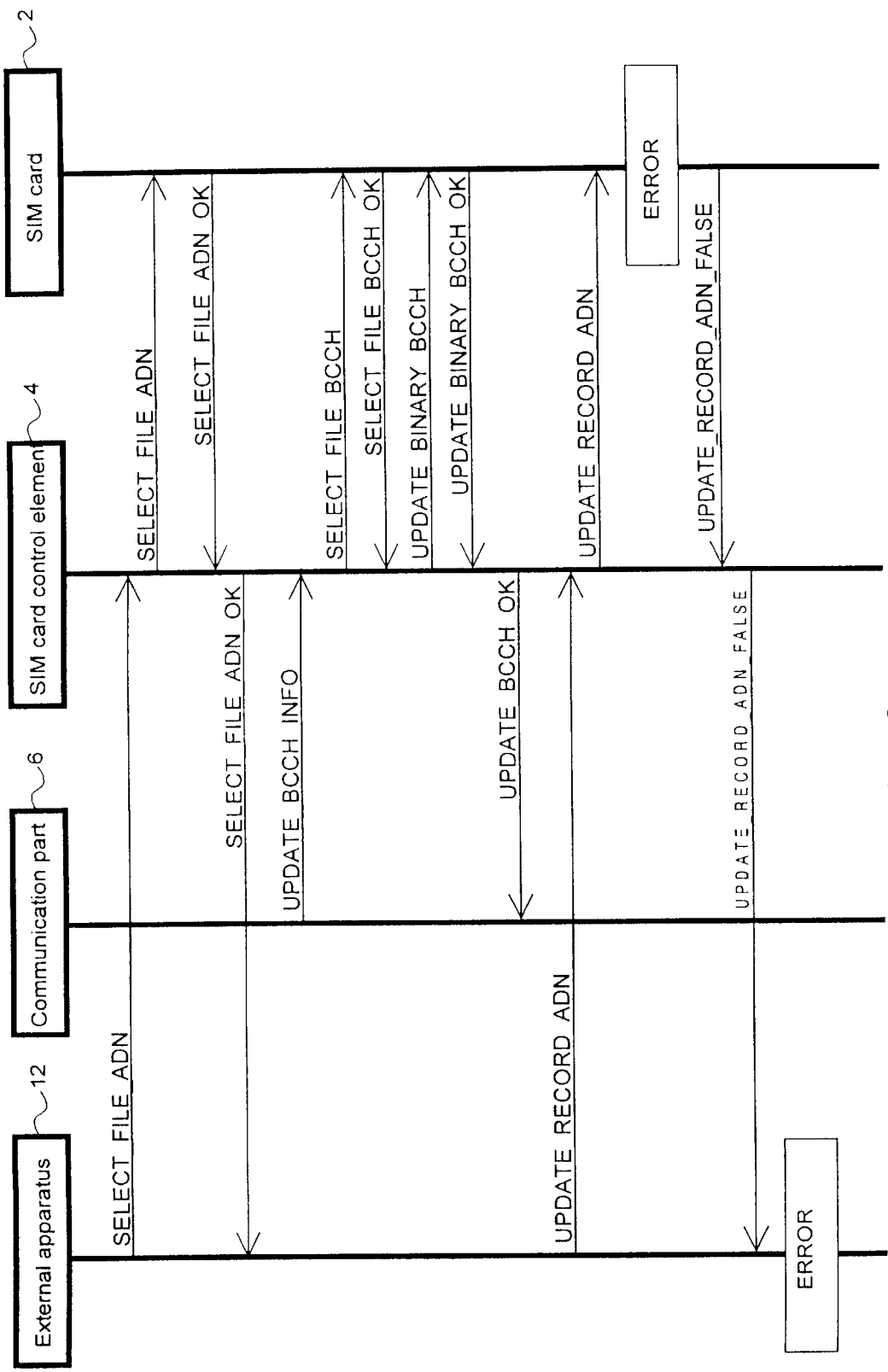
FIG. 3 shows a possible error occurring in the messaging according to the prior art.
Figure 4:
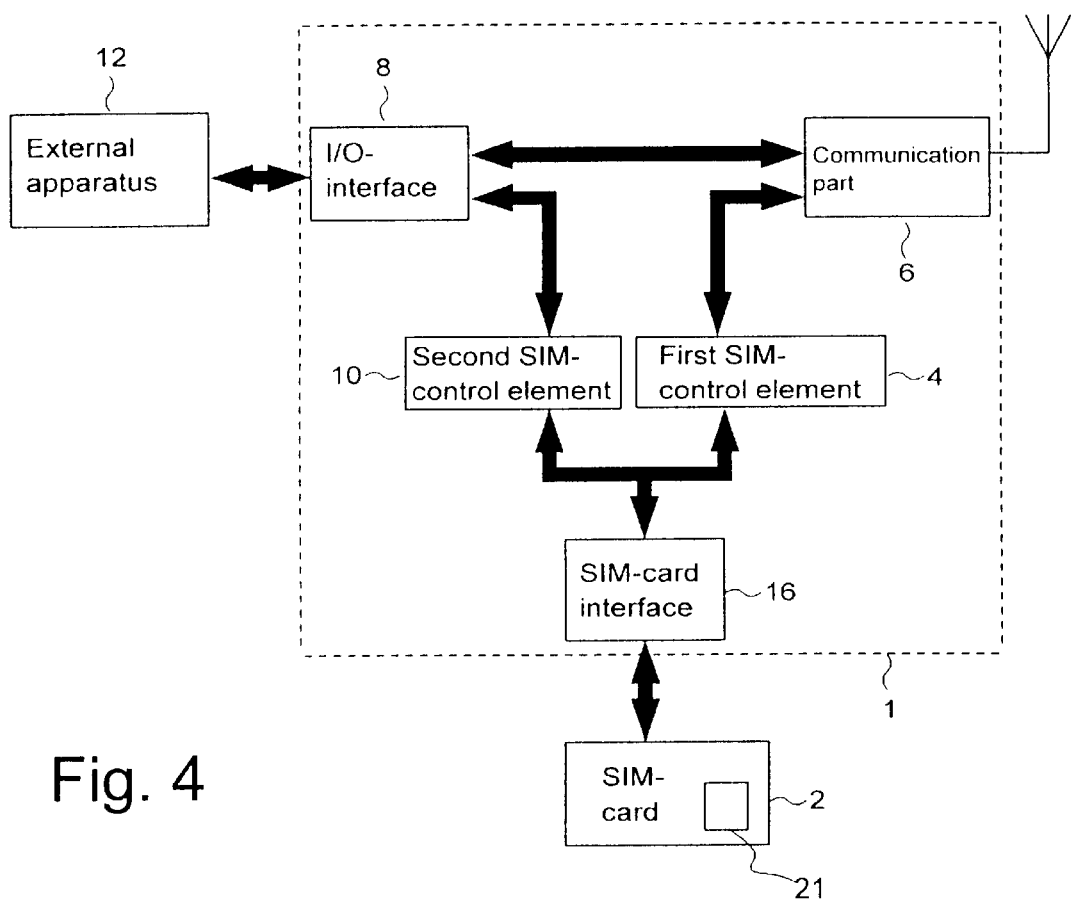
FIG. 4 shows an embodiment of the system according to the invention.
Figure 5:
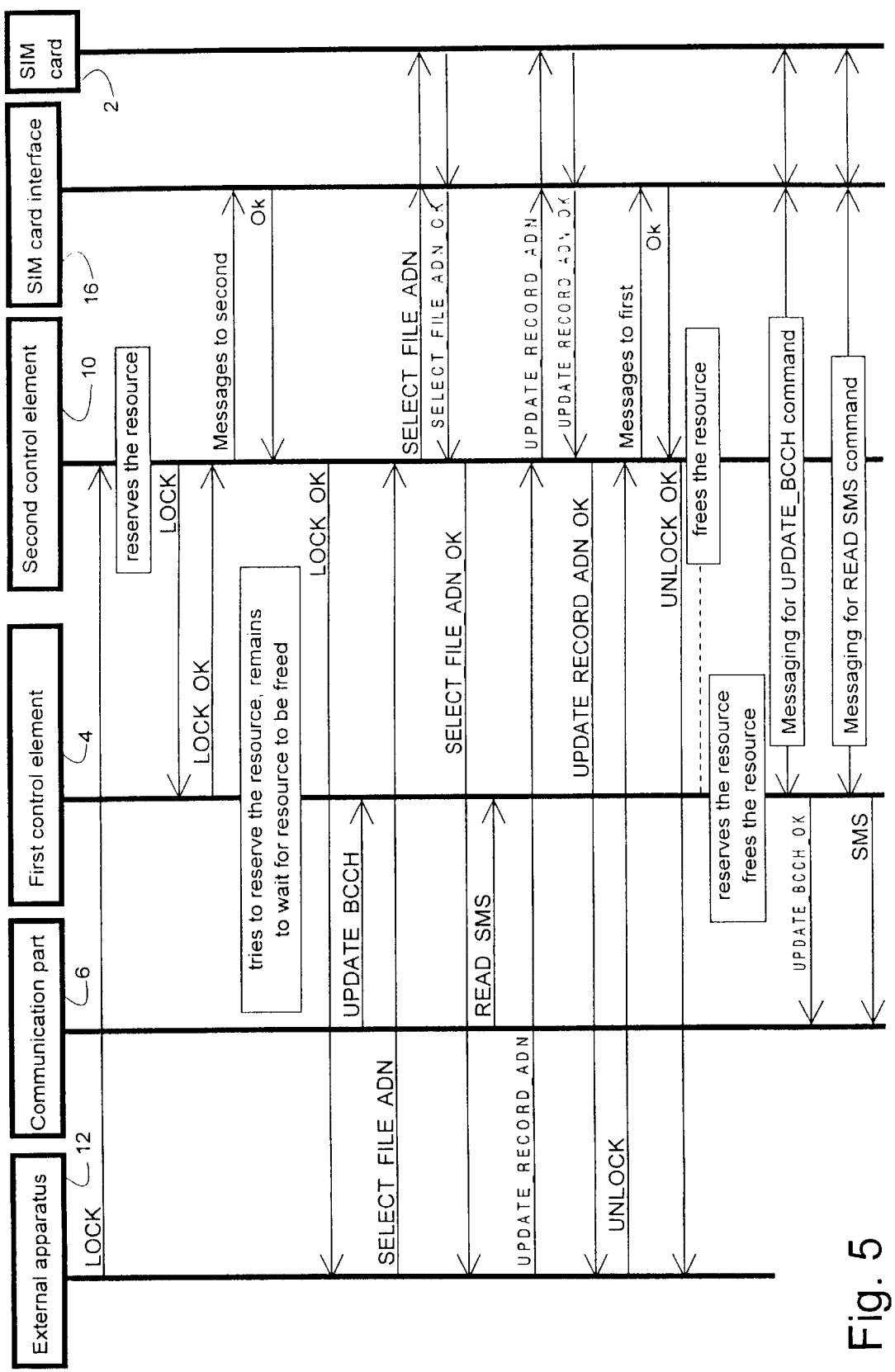
FIG. 5 shows messaging in a preferred embodiment of the invention.

FIG. 4 shows a block diagram of a preferred embodiment of the invention. In this example, the system employs two SIM card control elements 4, 10, the first control element 4 of which is arranged so as to serve the communication part 6 of the mobile station 1, and the second control element 10 is arranged so as to serve external apparatuses 12 connected to the mobile station through the I/O interface 8. In FIG. 4, the SIM card connected to the SIM card interface 16 comprises a memory 21. FIG. 5 shows an example of messaging according to the invention in such a system.

FIG. 5 displays messages exchanged in a preferred embodiment of the method according to the invention. An external apparatus 12 starts using the SIM card 2 by sending a locking command LOCK or another corresponding start signal to the second SIM card control element 10 serving external apparatuses. In response to the locking command the second SIM card control element 10 reserves a resource and locks the first control element 4 by means of command LOCK whereafter the first control element returns an acknowledgment LOCK_OK. Next, the second control element 10 sends a command to the SIM card interface 16 instructing it to send the messages to follow to the second control element 10, and the SIM card interface 16 returns an acknowledgment Ok.

Having returned the acknowledgment LOCK_OK the first control element attempts to reserve a resource, becomes locked and remains waiting for the resource to be freed. In the locked state this first SIM card control element 4 receives commands possibly sent by the communication part 6 but does not process them and they remain in queue until the locked state is removed.

Said second SIM card control element 10 sends to the external apparatus 12 an acknowledgment LOCK_OK, whereafter the external apparatus 12 can freely use the SIM card 2 by means of said second SIM card control element 10. The external apparatus 12 sends the SIM commands to said second SIM card control element 10 which forwards the commands to the SIM card 2 via the SIM card interface 16 and returns the resulting information from the SIM card 2 to the external apparatus 12.

Having completed the command sequence the external apparatus 12 sends a release command UNLOCK or a corresponding end signal to said second SIM card control element 10 whereafter this control element sends a command to the SIM card interface 16 to send the messages to follow to the first control element 4. The SIM card interface 16 returns an acknowledgment Ok. Next, the second SIM card control element 10 releases the resource which said first SIM card control element 4 is waiting for and sends an acknowledgment UNLOCK_OK to the external apparatus 12. In this example, the acknowledgment may also be sent before the resource is freed.

In the example of FIG. 5, the communication part 6 has sent the commands UPDATE_BCCH and READ_SMS to the first SIM card control element 4 during the locked state of said control element. The first SIM card control element 4 having been freed, the control element 4 starts processing these commands in the usual manner. For reasons of clarity, the usual messaging required by the UPDATE_BCCH and READ_SMS commands between the SIM card control element 4 and the SIM card 2 is not shown in detail in FIG. 5.

Figure 6:
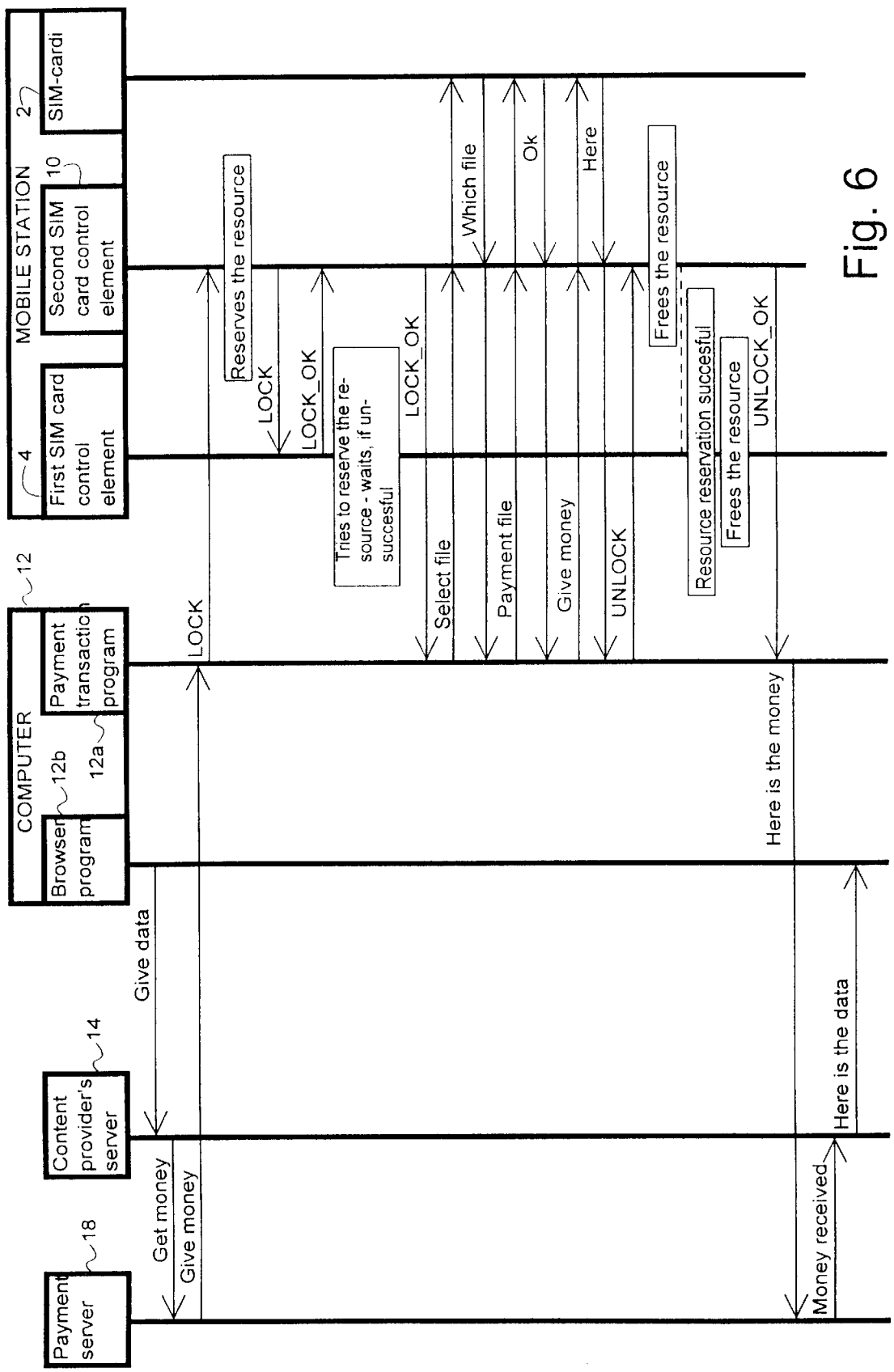
FIG. 6 shows messaging in a second preferred embodiment of the invention.

FIG. 6 shows an example of a possible embodiment of the invention. In this embodiment the SIM card is used as a money card which can be used to pay for various services in the telecommunications network. In this embodiment, said external apparatus is a portable computer which is connected to a data transmission network via a mobile station. The portable computer is running two programs, a browser program for reading information and a payment transaction program for making payments for services liable to charges. In this example, the data transmission network includes a service provider's server computer e.g. a newspaper company's or a stockbroker's server, and a bank's server receiving payments for said company, for instance.

When the user of the portable computer 12 makes a call via the mobile station and the data transmission network to the service provider's server 14 and uses services liable to charges, e.g. fetches stock exchange prices or headline news, the service provider's server 14 sends to the bank's payment server 18 a Get_money command to get money from the user. The payment server 18 sends a Give_money command to the payment transaction program 12*a* in the user's computer 12. Having received the command the payment transaction program 12*a* starts to use the SIM card. First the payment transaction program 12*a* sends to the mobile station, more specifically to said second SIM card control element 10 serving the mobile station's external apparatuses, a SIM card lock command LOCK. This second SIM card control element 10 reserves said resource and uses the LOCK message to inform the first SIM card control element 4 that it starts using the SIM card, and the first SIM card control element 4 sends an acknowledgment LOCK_OK. Having received the acknowledgment said second SIM card control element informs the external apparatus 12, 12*a* about the locking with a LOCK_OK message and sends a command to the SIM card interface 16 instructing it to send messages to follow to the second control element 10. For reasons of clarity, the SIM card interface 16 is not shown in FIG. 6. The control procedure for the SIM card interface 16 in this example is the same as in the example of FIG. 5.

Then the external apparatus 12, in this example the portable computer 12, controlled by the payment transaction program 12*a* running in it, starts to use the SIM card 2. As described above, the payment transaction program 12*a* sends to the SIM card via said second SIM card control element 10 first a file selection command Select_file, after the response Ok from the SIM card the code for the desired file Payments, and after another acknowledgment Ok the command Give_money. The SIM card yields data corresponding to the desired amount of money, whereafter the payment transaction program 12*a* sends to said second control element 10 the SIM card release command UNLOCK. Then the second control element 10 releases said resource and returns an acknowledgment UNLOCK_OK. Finally, the payment transaction program 12*a* sends the information corresponding to the desired amount of money to the payment server 18 which informs the content provider's server 14 that the payment was received whereafter the content provider's server 14 can send the desired information to the browser program 12*b* in the user's computer 12.

In this kind of an embodiment the SIM card advantageously records the latest commands in its memory in a special log file to allow recovery from an error situation. Such an error situation may for example be such that the communication link between the payment transaction program and the SIM card fails during the payment transaction. When the connection is later restored the payment transaction program and the SIM card can find out by means of the log file the point where the connection broke off and continue the interrupted transaction from the correct point. The log file may store the commands issued during a command sequence or a certain predetermined number of previous commands for example.

If a command sequence from the external apparatus takes too long a time e.g. because of delays caused by congestion in an external communications network, the system according to the invention advantageously breaks the connection between the external apparatus and the SIM card and makes the SIM card again available to the first SIM card control element 4. This kind of an embodiment can be realized e.g. in such a manner that the second control element 10 monitors the time used for the command sequence from the external apparatus 12 and if the duration of the command sequence exceeds a certain predetermined limit, the second control element 10 releases the SIM card by forcing the control of the SIM card to the first SIM card control element 4, sends a message about this to the external apparatus 12 and instructs the SIM card interface 16 to direct the messages sent by the card to the first SIM card control element. Advantageously the system informs the user about the interrupted transaction e.g. by means of the display of the mobile station.

The names of messages and commands used in the example above are only examples intended to illustrate the method.

In the example above, the payment transaction program 12*a* was responsible for giving the low-level SIM commands. In another preferred embodiment of the invention, the payment server 18 can handle the information exchange with the SIM card through low-level commands. This kind of an embodiment is particularly advantageous when the electronic money system used requires that the payment server 18 and the SIM card 2 identify each other in order to verify the payment transaction.

In addition to the example above, said external apparatus using electronic money stored on the SIM card may be e.g. a payment terminal in a store, a payment device on a public transportation means or other corresponding payment apparatus. The data transfer between the mobile station or other corresponding host device and the payment apparatus can be realized in a number of ways, such as by means of SMS messages, data transmission through an ordinary telephone connection or using an infrared, audio or RF signal.

Figure 7:
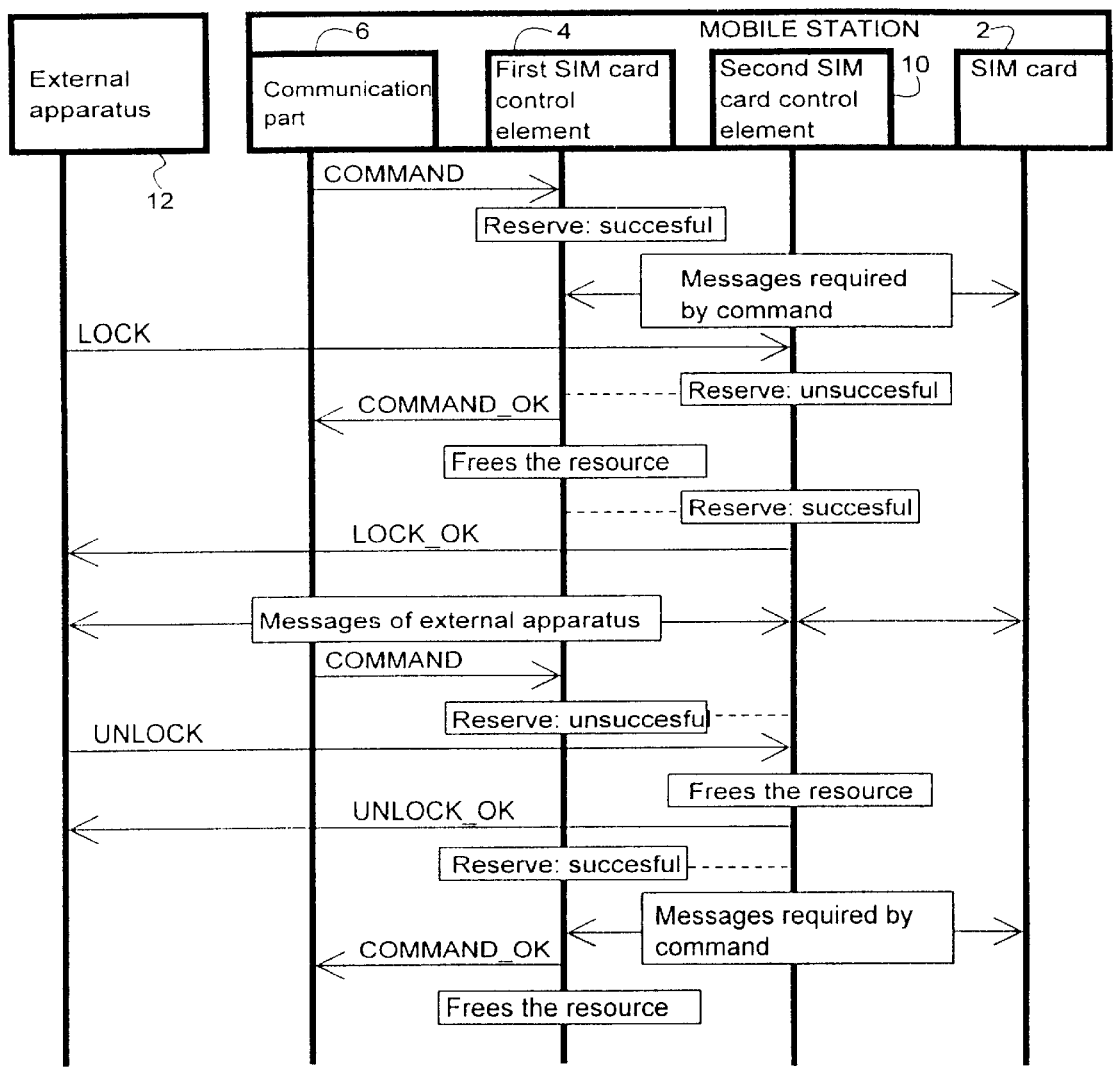
FIG. 7 shows messaging in a third preferred embodiment of the invention.

FIG. 7 shows a preferred embodiment of the invention employing a SIM card reservation method different from the embodiments described above. The example of FIG. 7 also uses a separate resource reserved by the control element requiring the use of the SIM card. In FIG. 7, the mobile station's communication part 6 sends to the first SIM card control element 4 the command COMMAND to execute a SIM card operation. The SIM card control element 4 attempts to reserve a resource and this time succeeds in it, whereafter the control element can carry out the communication with the SIM card as required by the command.

Meanwhile, the second SIM card control element 10 receives from the external apparatus 12 a SIM card reservation command LOCK, whereafter this second control element 10 tries to reserve the resource. The reservation is unsuccessful since the resource is already reserved by the first control element 4, so the second control element 10 remains waiting for a period of time which may be predetermined or indefinite within certain limits, for instance. After the execution of the command sequence the first control element returns an acknowledgment COMMAND_OK to the communication part and releases the resource. On the next attempt thereafter the second control element 10 succeeds in reserving the resource, whereafter the second control element 10 returns an acknowledgment LOCK_OK to the external apparatus. Having received the acknowledgment the external apparatus 12 executes the required command sequence. In the example of FIG. 7, the first control element 4 at this point receives a COMMAND from the communication part 6 and tries to reserve the resource. The reservation, however, fails as the resource is reserved by the second control element 4, so the first control element remains waiting for the resource to be freed. At the end of the command sequence the external apparatus 12 sends an UNLOCK command to the second control element 10 to end the use of the SIM card, and the second control element 10 releases the resource and returns an acknowledgment UNLOCK_OK to the external apparatus. Then the resource can be reserved by the first control element 4, and the control element 4 reserves the resource, carries out the command sequence required by the command, returns an acknowledgment COMMAND_OK to the communication part 6 and releases the resource to bring the system back to the initial state.

For reasons of clarity, FIG. 7 does not show the control commands for the SIM card interface 16. In the example of FIG. 7, the interface 16 can be controlled wholly by the second control element 10, for instance, so that after reserving a resource the second control element sends to the interface 16 a command to direct the messages sent by the card to the second control element 10, and after the command sequence is completed and the resource freed the second control element sends to the interface 16 a command to direct the messages sent by the card again to the first control element 4. Another possible way to arrange the controlling of the interface 16 is such that after reserving the resource each control element sends to the interface 16 a command to direct the card's messages to that particular control element. In such an embodiment the SIM card message control can be made dependent of the resource reservation: for example, the interface 16 may direct the SIM card's messages always to that particular control element which has reserved the resource, so the control elements need not issue a separate command to the interface 16.

Above it was in connection with the descriptions of FIGS. 5, 6 and 7 described various methods for reserving an object, such as a SIM card, for a certain element. However, the invention is not limited to those examples, but in the various embodiments of the invention it is possible to use other prior art methods for reserving an object for a certain element.

Figure 8:
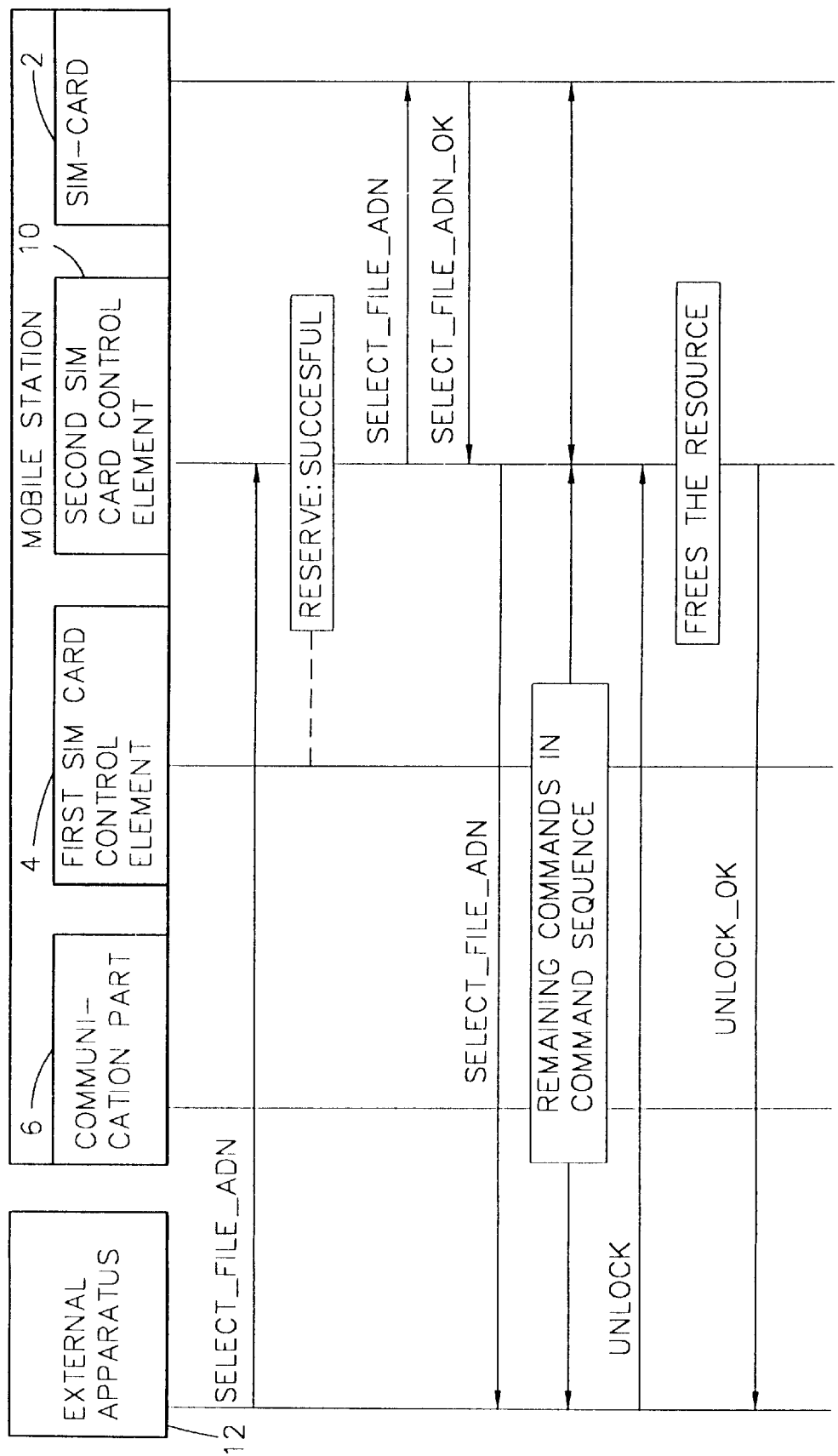
FIG. 8 shows messaging in a fourth preferred embodiment of the invention.

In the examples described above the external apparatus issues a separate start signal to reserve the SIM card before issuing the low-level commands. FIG. 8 shows the exchange of messages in a preferred embodiment differing from that arrangement. This embodiment does not employ a separate start signal but the external apparatus sends the first command of the low-level command sequence directly. In this case, said second control element 10 attempts to reserve the resource only after the reception of that first command. Having successfully reserved the resource and thus the SIM card the second control element 10 sends said first command to the SIM card and returns the response from the SIM card to the external apparatus 12. Then the external apparatus 12 can execute the command sequence in question, whereafter it sends a SIM card release command UNLOCK to the second SIM card control element 10. The second control element 10 frees the resource and returns an acknowledgment UNLOCK_OK. For reasons of clarity FIG. 8 does not show the control commands for the SIM card interface 16. In this embodiment the SIM card interface 16 can be controlled using the methods described in connection with the embodiment of FIG. 7 for example.

Figure 9:
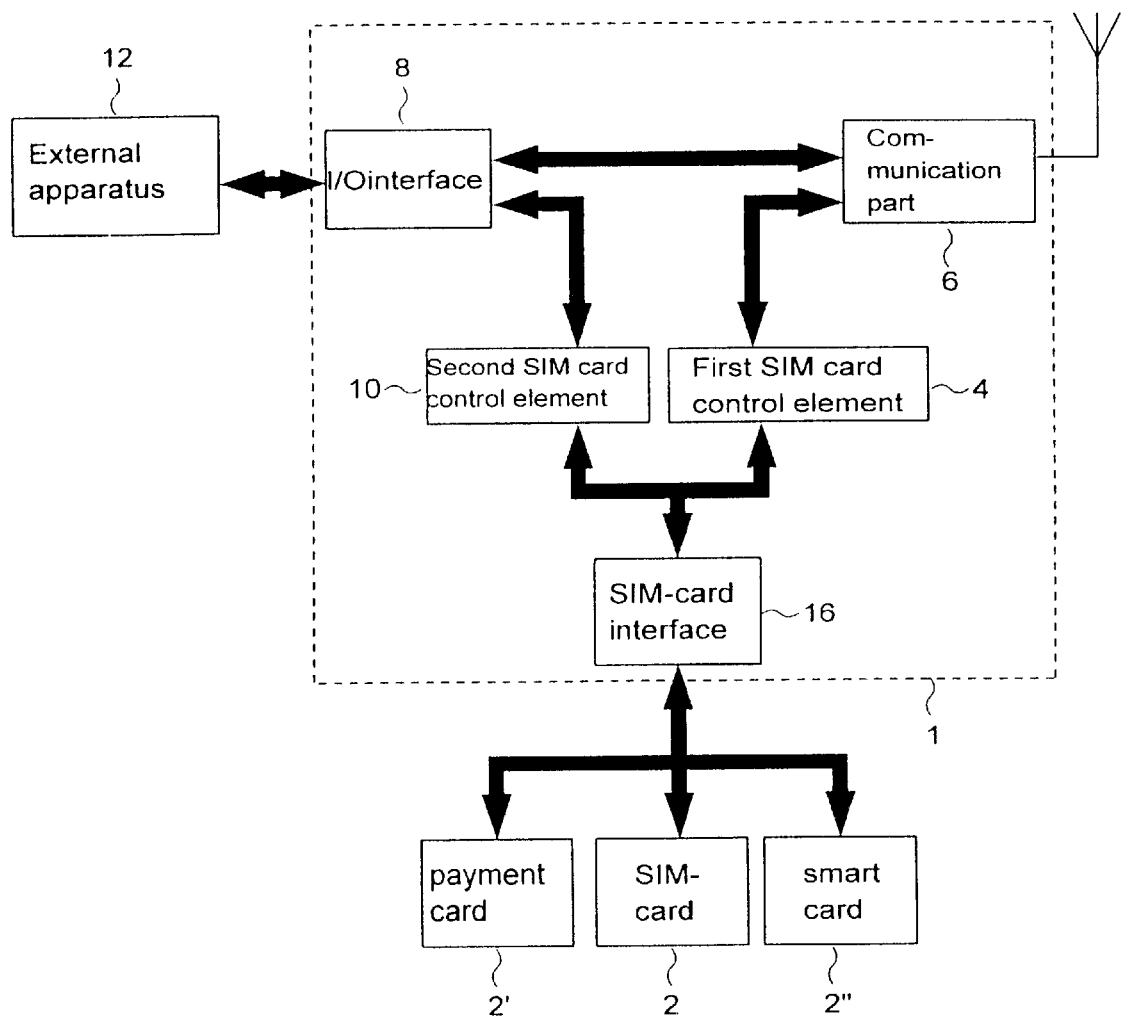
FIG. 9 shows an embodiment of the invention in which multiple smart cards are connected to one host device.

FIG. 9 shows a schematic of a preferred embodiment of the invention. This embodiment, disclosed by way of example, has more than one smart card 2, 2', 2" connected to one host device. Such an embodiment is especially suitable when one wants to have in his his mobile station, in addition to a SIM card, a separate pay card for using services liable to charges. In this embodiment the SIM card interface 16 comprises e.g. one messaging element to convey the commands to the desired smart card and on the other hand to convey the response messages to the desired either first or second SIM card control element 4, 10, and the required mechanical and electrical connections for the smart cards, e.g. connections according to the ISO 7816-2 and 7816-3 standards. In this kind of an embodiment the control elements 4. 10 must indicate to the interface 16 the card to be used. This can be realized in many ways.

One method for selecting the card to be used is as follows: by default the SIM card interface 16 directs all commands to a certain smart card 2 so that the commands of the first control element automatically go to that particular smart card. When the second SIM control element 10 wants to use a card it first informs the SIM card interface in the manner described above that it should return subsequent messages from the card to the second control element 10. Then the second control element 10 indicates to the SIM card interface the card to which the commands to follow are to be sent. When the external apparatus 12 has stopped using the card, the second control element 10 tells the SIM card interface that subsequent messages from the card are to be returned to the first control element 4 and subsequent commands are to be sent to the default smart card 2.

Another method for selecting the smart card is such that both the first control element 4 and the second control element 10 can tell the interface 16, at the beginning of a command sequence, which is the smart card that the commands are to be sent to. In this implementation, too, one of the smard cards can be selected by default, so at the beginning of a command sequence sent to that smart card there need not be an indication about the smart card used, ie. the smart card has to be specified only when the desired card is another than the default card. This method has the advantage that the host device, too, can use all the smart cards if necessary.

Said first control element 4 and second control element 10 can be advantageously realized by a fixed electronic circuit or as programs in the microprocessor controlling the operation of the mobile station.

In the examples described above, said first and second SIM card control elements have certain specific tasks different from each other. However, the invention can be realized in such a manner that both control elements process both low-level commands from external apparatuses and high-level commands from the mobile station's internal blocks. In such an embodiment, a command or a low-level command sequence is executed by the control element that is free at the moment when the first command is received or, if both control elements are free, by a predetermined control element, or by the control element indicated by a special command controller. In such an embodiment, the control elements have to be able to recognize whether a given command is a high-level command or a subcommand of a low-level command sequence. Such recognition can be realized e.g. by comparing the command to a database of known high-level commands so that commands other than those mentioned in the database are interpreted as low-level commands. Another possible method of implementation is to use a flag to indicate whether the command is a low-level command or a high-level command. In such an embodiment, the value of said flag can be as follows: the mobile station's internal blocks set the flag value to "high-level command" before issuing a high-level command, and, correspondingly, the system sets the flag value to "low-level command" when an external apparatus issues a command. When the first or second SIM card control element receives the first command of a low-level command sequence, the control element in question reserves the SIM card for itself and the other control element remains waiting. During the low-level command sequence the control element waiting receives possible high-level commands and puts them in queue to wait for the low-level command sequence to end. During the low-level command sequence the control element waiting does not process low-level commands and, correspondingly, the active control element does not process high-level commands.

The examples above describe the use of a mobile station as the host device in the system according to the invention. However, the invention is not limited to the use of an ordinary mobile station, but the host device may be a multi-purpose mobile communication device, a so-called personal digital assistant (PDA) or another apparatus employing a SIM card or another smart card. Such a multipurpose mobile communication device may be e.g. a communicator, which comprises both a mobile communication device and a multipurpose computer or a PDA physically integrated within a single portable device, but which logically and functionally are separate units having an I/O interface between them.

The examples above describe the use of a SIM card in various embodiments of the invention. However, the invention is not limited to the use of the SIM card but the smart card 2 may be a smart card complying with another standard as well, such as a pay card, for example, depending on the application of the invention. The smart card may be a so-called active smart card containing a processor of its own, or a passive smart card executing only commands issued outside the card. The connection of the smart card to the system's host device may also vary depending on the type of the card. For example, if the smart card is a so-called remotely read smart card, it need not be physically connected to the host device in the system according to the invention.

An active smart card may also initiate a sequence of events leading to the reading of smart card data. An example of such an embodiment is an implementation employing a card that contains an electronic payment application. Such a system advantageously comprises a special controller which controls the sending of commands from the card to the control elements. Such a controller is particularly advantageous when more than one card can be connected to the system or when the system comprises control elements specializing on certain services, such as a control element for a smart card processing only money transactions. When the card containing the payment application is connected to the card interface 16, said controller informs the card about the control elements available. Then the card can send a transaction initiating command or command sequence to said special smart card control element dealing with money transactions and the control element can start communicating with the external apparatus, such as a cash-register terminal, for example. Then the cash-register terminal can get the money data from the card using low-level commands and a method described in this application. Such a smart card control element handling electronic payments and assisted by other blocks of the host device can produce on the host device's display a payment menu or otherwise prompt for the user's approval for the transaction or ask the user to enter the sum to be paid. In such an application the smart card control element handling the payment transactions can alternatively operate as the payment transaction program 12a in the embodiment depicted in FIG. 6, ie. receive payment requests according to a common practice or standard and carry out the low-level communication with the card.

In the solution according to the invention, the connection between the I/O interface 8 and the external apparatus 12 can be realized in many ways known in the prior art, e.g. as a wired connection or a connection implemented using an infrared link. Said external apparatus 12 may also be an apparatus other than a portable computer. As previously mentioned, such external apparatus may be external to the mobile communication means while being integrated in the same physical device, for example a multipurpose communication device comprising both a computer and a mobile communication means within the same housing, in which case the I/O interface is internal to said housing.

By means of external apparatuses the arrangement according to the invention can be used to realize new applications using the SIM card. For example, the user of a mobile station according to the invention can install in his portable computer new software employing the features of the SIM card.

In addition, the arrangement according to the invention makes it possible to program active SIM cards, which are under development, from outside the mobile station. An ordinary SIM card is a so-called passive card which merely executes commands coming to it from outside the card. An active smart card can be provided with a program, whereafter the smart card will operate in accordance with the program without external control. The arrangement according to the invention can be used to load new software in an active smart card, such as an active SIM card, connected to a mobile station, while the mobile station is being used.

Above the invention was described with reference to preferred embodiments, but it is clear that the invention can be modified in many ways within the scope of the inventional idea defined by the claims set forth below. In the claims the term unit is used to denote the apparatus 12 external to the communication means.

What is claimed is:

1. An apparatus having means for functionally connecting a smart card to the apparatus, comprising:

a first smart card control element for receiving high-level control commands belonging to a predetermined selection of commands, for controlling a smart card connected to the smart card connection means according to a predetermined low-level command sequence corresponding to the control command in question; and a second smart card control element for receiving low-level commands and for conveying them to the smart card connected to the smart card connection means;

wherein said smart card control elements are arranged to reserve the smart card connected to the smart card connection means for one smart card control element at a time; and during operation of the apparatus with an external source of command signal, said second smart card control element is responsive to a command from said external source to reserve a resource, provided that if said resource is reserved by said first smart card control element, said second smart card control element is to wait for a release of said resource.

2. The apparatus of claim 1 comprising
   an I/O interface for connection of external apparatuses and for transferring of commands from an external apparatus connected to the I/O interface to said second smart card control element, and
   at least one further internal block for sending said high-level control commands to said first smart card control element.

3. The apparatus of claim 1, wherein the means for functionally connecting a smart card to the apparatus is adapted to connect to more than one smart card at a time.

4. A system having a host device which has
means for functionally connecting a smart card to the system, and
at least one smart card functionally connected to the means, the system comprising;
a first smart card control element in the host device for receiving high-level control commands belonging to a predetermined selection of commands, for controlling a smart card connected to the smart card connection means according to a predetermined low-level command sequence corresponding to the control command in question;
a second smart card control element in the host device for receiving low-level commands and for conveying them to the smart card connected to the smart card connection means, said smart card control elements being arranged to reserve the smart card connected to the smart card connection means for one smart card control element at a time;
at least one further internal block in the host device for sending said high-level control commands to said first smart card control element;
an I/O interface in the host device for connecting external apparatuses and for transferring commands from an external apparatus to said second smart card control element; and
an external apparatus connected to said I/O interface;
wherein during operation of the system with said external apparatus, said second smart card control element is responsive to a command from said external apparatus to reserve a resource, provided that if said resource is reserved by said first smart card control element, said second smart card control element is to wait for a release of said resource.

5. The system of claim 4, wherein at least one smart card is an active smart card provided having a processor.

6. The system of claim 4, comprising a memory in the smart card for storing at least one received command for recovery from an error situation.

7. A method for conveying commands from a unit to a smart card,
which smart card can be controlled at least via a first smart card control element and a second smart card control element, and which commands from the unit to the smart card are conveyed via the second smart card control element,
comprising steps in which
said unit sends a first command to the second smart card control element,
in response to said command the second smart card control element attempts to reserve the smart card for itself,
when the reservation succeeds, the second smart card control element informs the unit of the reservation,
whereafter the unit sends commands to the second smart card control element which passes them on to the smart card and returns the responses from the smart card to the unit,
the unit sends an end command to said second smart card control element, and
in response to the end command the second control smart card element releases the smart card for use by other smart card control elements.

8. The method of claim 7, comprising steps in which
the second smart card control element remains waiting for the smart card to be freed, if the smart card is in use by the first smart card control element when the second smart card control element tries to reserve it; and
the first smart card control element remains waiting for the smart card to be freed, if the first smart card element tries to use the smart card when the smart card is being used by the second smart card control element.

9. The method of claim 7, wherein
the conveyed commands form command sequences, each of which is terminated with an end command,
the method further having steps in which
the second smart card control element monitors the time used by the unit to send the commands of a command sequence,
the second smart card control element compares the time to a predetermined time limit and if the time exceeds said time limit, the second smart card control element releases the smart card for use by other smart card control elements.

10. The method of claim 7, wherein said first command sent by said unit is a smart card reservation command.

11. A mobile communication device having means for functionally connecting a smart card to the device, comprising:
a first smart card control element for receiving high-level control commands belonging to a predetermined selection of commands, for controlling a smart card connected to the smart card connection means according to a predetermined low-level command sequence corresponding to a control command in question;
a second smart card control element for receiving low-level commands and for conveying them to the smart card connected to the smart card connection means;
an input/output interface for connection of external apparatuses and for transferring of commands from an external apparatus connected to the input/output interface to said second smart card control element;
at least one further internal block for sending high-level control commands to said first smart card control element; and
wherein said first and said second smart card control elements are arranged to reserve the smart card connected to the smart card connection means for one of said smart card control elements at a time; and
during operation of the communication device with said external apparatus, said second smart card control element is responsive to a command from said external apparatus to reserve a resource, provided that if said resource is reserved by said first smart card control element, said second smart card control element is to wait for a release of said resource.

12. A system having a portable computer and a mobile communication device, said mobile communication device having means for functionally connecting a smart card to the device, the system comprising:
a first smart card control element in the mobile communication device for receiving high-level control commands belonging to a predetermined selection of commands, and for controlling a smart card connected to the smart card connection means according to a predetermined low-level command sequence corresponding to a control command in question;
a second smart card control element in the mobile communication device for receiving low-level commands and for conveying them to the smart card connected to the smart card connection means;

an input/output interface in the mobile communication device for connection of the portable computer to the mobile communication device and for transferring of commands from the portable computer connected to the input/output interface to said second smart card control element;

at least one further internal block in the mobile communication device for sending said high-level control commands to said first smart card control element; and wherein said first and said smart card control elements in the mobile communication device are arranged to reserve the smart card connected to the smart card connection means for one of said smart card control elements at a time; and during operation of the system with said computer, said second smart card control element is responsive to a command from said computer to reserve a resource, provided that if said resource is reserved by said first smart card control element, said second smart card control element is to wait for a release of said resource.

* * * * *